Jan. 1, 1929. 1,697,307
J. T. EARNEST
SAND GUARD FOR TRACTOR WHEELS
Filed Dec. 8, 1927
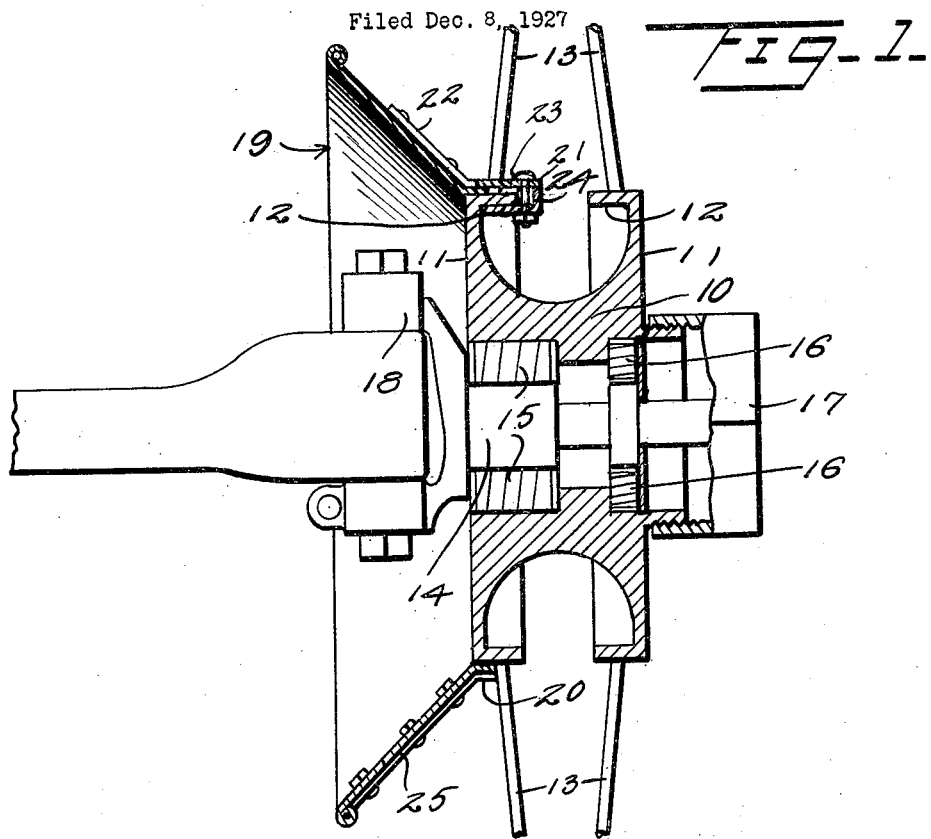
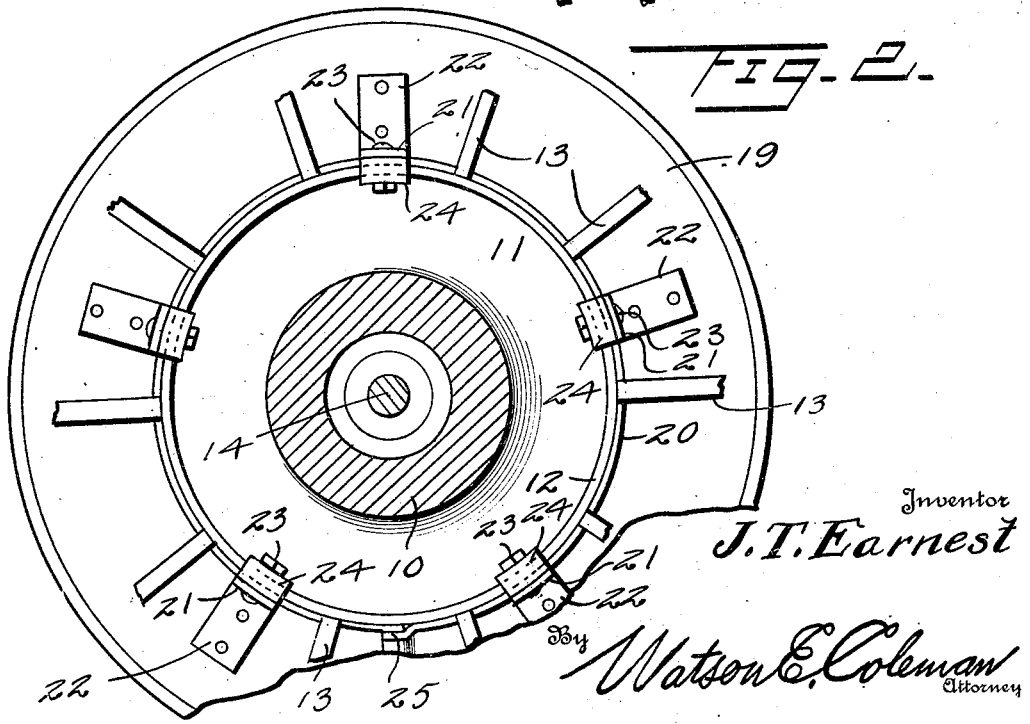
Inventor
J. T. Earnest
By Watson E. Coleman
Attorney Patented Jan. 1, 1929.

1,697,307

UNITED STATES PATENT OFFICE.

JOHN T. EARNEST, OF EUSTIS, FLORIDA.

SAND GUARD FOR TRACTOR WHEELS.

Application filed December 8, 1927. Serial No. 238,627.

This invention relates to sand guards for the bearings of tractor wheels and more particularly to a guard for preventing the collection of sand at the inner face of the hub of the steering wheels of tractors from which point it usually finds its way into the bearing to destroy the same.

An important object of the invention is to provide a device of this character which may be readily attached to the tractor wheel without in any manner altering the present structure thereof and which may be very readily and cheaply produced.

A further object of the invention is to produce a device of this character which will not in any way interfere with the movements of the wheel in operation.

These and other objects I attain by the construction shown in the accompanying drawings, wherein for the purpose of illustration is shown a preferred embodiment of my invention and wherein:—

Figure 1 is a vertical sectional view through a vehicle wheel embodying the sand guard constructed in accordance with my invention;

Figure 2 is a vertical sectional view through the wheel hub.

Referring now more particularly to the drawings, the numeral 10 generally designates the hub of the tractor wheel. These hubs are usually provided at both their inner and outer edges with upstanding flanges 11, the upper ends of which are inturned as at 12 to provide seats for the spokes 13 of the wheel. This hub engages the spindle 14 of the axle through inner and outer roller bearings 15 and 16. The outer bearing 16 is protected by a cap 17 which prevents entrance of sand and dirt thereto. The inner bearing cannot, however, be protected in this manner in ordinary steering wheel constructions since the spindle mounting 18 will interfere with the application of the guard.

In accordance with my invention I provide a frusto-conical shield 19 having a diameter at the smaller end equal to the external diameter of the hub at the inturned portion 12. This end of the shield has a relatively short cylindrical flange 20 adapted to exteriorly fit the inturned portion outwardly of the spokes 13 and which engages against the spokes 13 to limit inward movement of the guard. Secured to the guard are inwardly extending prongs 21 adapted to enter between the spokes and preferably formed as extremities of bars 22 which are riveted or otherwise secured to the guard. These prongs at their inner ends are perforated for the passage of securing elements 23 by means of which angle brackets 24 are connected to the prongs. One flange of each angle bracket abuts the associated prong while the other flange through which the securing element 23 is directed is adapted to have its free end extended beneath the inner edge of the inturned portion 12 of the flange 11 to clamp thereagainst.

It will be obvious that a structure of this character may be very readily applied to the wheel and by splitting the guard as indicated at 25 it may be applied without the necessity of removing the wheel from the spindle. Any dirt or dust picked up by the wheel rim (not herein shown) which would normally fall against the inner face of the hub or upon the spindle mounting 18 will be deflected outwardly by the guard and fall upon the outer face of the hub from which point it will be finally returned to the ground. The structure, therefore, serves not only as a guard to prevent the entrance of dirt to the bearing 15 but likewise serves to protect the spindle mounting bearings as well.

Since the structure employed is obviously capable of a certain range of change and modification without materially departing from the spirit of the invention, I accordingly do not limit myself to such specific structure except as hereinafter claimed.

I claim:—

1. The combination of an axle, a spindle mounted for oscillation thereon, a wheel having its hub mounted upon the spindle, a frustro-conical guard secured to the wheel hub at its smaller end and having its larger end extending inwardly of the spindle mounting, said guard being transversely split for the application thereof without removal of the spindle.

2. In combination with a wheel including a hub, the hub having at its ends circumferential flanges the outer ends of which are inturned to provide a seat, a frustro-conical guard having its smaller end of the same diameter as the external diameter of the hub at the inturned portion thereof, said inner end being provided with an extension fitting upon the inturned portion, means for securing the guard to the hub comprising prongs projecting inwardly from the extension of the guard, securing elements extending through said prongs, and clamping elements mounted upon the securing elements and engaging the inner faces of the inturned portions of the flanges.

3. In combination with a wheel including a hub, a frustro-conical guard having its smaller end of the same diameter as the external diameter of the hub, said inner end being provided with an extension fitting upon the hub, and means for securing the guard to the hub, said guard being split to permit application thereof to the hub at the axle end of the wheel without removal of the wheel from the axle.

In testimony whereof I hereunto affix my signature.

JOHN T. EARNEST.